United States Patent
Kimura

(10) Patent No.: US 8,341,354 B2
(45) Date of Patent: Dec. 25, 2012

(54) CACHE COLORING METHOD AND APPARATUS BASED ON FUNCTION STRENGTH INFORMATION

(75) Inventor: Shigeru Kimura, Kawasaki (JP)

(73) Assignee: Fujitsu Semiconductor Limited, Yokohama (JP)

( * ) Notice: Subject to any disclaimer, the term of this patent is extended or adjusted under 35 U.S.C. 154(b) by 1165 days.

(21) Appl. No.: 12/078,650

(22) Filed: Apr. 2, 2008

(65) Prior Publication Data

US 2009/0037659 A1 Feb. 5, 2009

(30) Foreign Application Priority Data

Jul. 30, 2007 (JP) ................. 2007-198002

(51) Int. Cl.
*G06F 12/08* (2006.01)
(52) U.S. Cl. ........................ 711/125; 711/170
(58) Field of Classification Search ............... None
See application file for complete search history.

(56) References Cited

U.S. PATENT DOCUMENTS

| 7,581,064 B1 * | 8/2009 | Zedlewski et al. ............ 711/118 |
| 7,895,392 B2 * | 2/2011 | Shen et al. .................... 711/113 |
| 2005/0210453 A1 | 9/2005 | Kimura ......................... 717/120 |

FOREIGN PATENT DOCUMENTS

| JP | 2002-99427 | 4/2002 |
| JP | 2003-271394 | 9/2003 |
| JP | 2005-266941 | 9/2005 |
| JP | 2007-148556 | 6/2007 |

OTHER PUBLICATIONS

Japanese Office Action issued Jul. 17, 2012 in corresponding Japanese Patent Application No. 2007-198002.

* cited by examiner

*Primary Examiner* — Gary Portka
(74) *Attorney, Agent, or Firm* — Staas & Halsey LLP

(57) ABSTRACT

A method of performing cache coloring includes the steps of generating a dynamic function flow representing a temporal sequence in which a plurality of functions are called at a time of executing a program comprised of the plurality of functions by executing the program by a computer, generating function strength information in response to the dynamic function flow by use of the computer, the function strength information including information about runtime relationships between any given one of the plurality of functions and all the other ones of the plurality of functions in terms of a way the plurality of functions are called and further including information about degree of certainty of cache miss occurrence, and allocating the plurality of functions to memory space by use of the computer in response to the function strength information such as to reduce instruction cache conflict.

9 Claims, 15 Drawing Sheets

| i\j | A | B | C | D | E | F |
|---|---|---|---|---|---|---|
| A | 2 | 1 | 1 | 1 | 1 | 1 |
| B | 0 | 6 | 3 | 3 | 2 | 1 |
| C | 0 | 2 | 9 | 6 | 0 | 0 |
| D | 0 | 2 | 5 | 6 | 0 | 0 |
| E | 0 | 1 | 0 | 0 | 3 | 1 |
| F | 0 | 0 | 0 | 0 | 0 | 1 |

| i\j | A | B | C | D | E | F |
|---|---|---|---|---|---|---|
| A | 2 | 5 | 5 | 5 | 5 | 5 |
| B | 0 | 6 | 6 | 6 | 4 | 2 |
| C | 0 | 2 | 9 | 6 | 0 | 0 |
| D | 0 | 4 | 10 | 6 | 0 | 0 |
| E | 0 | 1 | 0 | 0 | 3 | 1 |
| F | 0 | 0 | 0 | 0 | 0 | 1 |

FIG.8

| i\j | A | B | C | D | E | F |
|---|---|---|---|---|---|---|
| A | 10 | 5 | 5 | 5 | 5 | 5 |
| B | 0 | 24 | 12 | 12 | 8 | 4 |
| C | 0 | 4 | 18 | 6 | 0 | 0 |
| D | 0 | 4 | 10 | 12 | 0 | 0 |
| E | 0 | 2 | 0 | 0 | 6 | 2 |
| F | 0 | 0 | 0 | 0 | 0 | 1 |

FIG.9

| i\j | A | B | C | D | E | F |
|---|---|---|---|---|---|---|
| A | 2 | 5 | 5 | 5 | 5 | 5 |
| B | 0 | 6 | 6 | 6 | 3 | 2 |
| C | 0 | 2 | 9 | 6 | 0 | 0 |
| D | 0 | 4 | 7 | 6 | 0 | 0 |
| E | 0 | 1 | 0 | 0 | 3 | 1 |
| F | 0 | 0 | 0 | 0 | 0 | 1 |

FIG.12

| i \ j | A | B | C | D | E | F | M(i) |
|---|---|---|---|---|---|---|---|
| A | 2 | 5 | 5 | 5 | 5 | 5 | 20 |
| B | 0 | 6 | 6 | 6 | 4 | 2 | 18 |
| C | 0 | 2 | 9 | 6 | 0 | 0 | 8 |
| D | 0 | 4 | 10 | 6 | 0 | 0 | 14 |
| E | 0 | 1 | 0 | 0 | 3 | 1 | 2 |
| F | 0 | 0 | 0 | 0 | 0 | 1 | 0 |

CORRESPONDING CACHE LINE NUMBER

| CACHE LINE NUMBER | ADDRESS FOR ALLOCATION |
|---|---|
| L0 | xxxx xx0x |
| L1 | xxxx xx1x |
| L2 | xxxx xx2x |
| L3 | xxxx xx3x |
| L4 | xxxx xx4x |
| L5 | xxxx xx5x |
| L6 | xxxx xx6x |
| L7 | xxxx xx7x |

CACHE COLORING METHOD AND APPARATUS BASED ON FUNCTION STRENGTH INFORMATION

CROSS-REFERENCE TO RELATED APPLICATIONS

The present application is based upon and claims the benefit of priority from the prior Japanese Patent Application No. 2007-198002 filed on Jul. 30, 2007, with the Japanese Patent Office, the entire contents of which are incorporated herein by reference.

BACKGROUND OF THE INVENTION

1. Field of the Invention

The disclosures herein generally relate to methods of allocating functions to memory space, and particularly relate to a cache coloring method that allocates functions to memory space such as to reduce the possibility of cache conflict.

2. Description of the Related Art

In computer systems, generally, a cache memory that is smaller in capacity and faster than the main memory is provided in addition to the main memory. Part of the information stored in the main memory is copied to the cache. When this information needs to be accessed, a faster retrieval of information is attained by reading the information from the cache rather than from the main memory.

As caches are capable of high-speed operations and thus more expensive than main memories, their storage capacity is very small. A cache contains a plurality of cache lines, and the copying of information from an external memory (i.e., the main memory) to the cache is performed on a cache-line-specific basis. Because of this, the memory space of the external memory is divided in units of cache lines, and the divided memory areas are successively allocated to the cache lines in advance. Since the capacity of the cache is smaller than the capacity of the external memory, the memory areas of the external memory are repeatedly allocated to the same cache lines.

When program functions are to be executed, different program functions allocated to different addresses in the external memory may be allocated to the same cache line. In this case, one of the program functions needs to be copied to the cache at every turn when the program functions are alternately called. This is referred to as cache conflict. The problem is that the more frequent the occurrence of cache conflict, the slower the execution speed of the program is. In order to obviate this problem, it is preferable to avoid allocating functions having the high likelihood of simultaneous executions to the same cache line, and research efforts have been made to this end.

In order to obviate the problem of cache conflict, the strength of function may be defined as an indication of the number of calls between functions and the number of calls of a specific function-calling pattern. In the related art, there is a method by which functions having the great strength of function (i.e., there is a high possibility of the functions calling each other) are not allocated to the same cache line. Setting and modifying of link sequences on a function-specific basis for the purpose of reducing cache conflict and instruction cache miss is called cache coloring.

In the cache coloring method (see Patent Document 1) proposed by the applicant of this application, function strength information is generated in response to a dynamic function flow representing a time sequence in which a plurality of functions are called at the time of program execution, such that the function strength information includes information about runtime relationships between all the functions in terms of a way the functions are called. The dynamic function flow may be generated by tracing the calling of functions at the time of program execution. The function strength information can represent mutual relationships between functions (relationships between any given function and all the other functions), which was impossible in the conventional art. The use of such information makes it possible to provide the optimum allocation of functions that minimizes the number of instruction cache misses. The cache coloring method disclosed in Patent Document 1 provides four different types of function strength information as specific definitions of function strength information.

In general, the effect of cache miss suppression may depend on individual programs when a specific type of function strength information is used for cache coloring. Namely, the effect of cache miss suppression may be sufficient with respect to a given program while the effect of cache miss suppression may not be sufficient with respect to other programs. In this case, the definition of function strength information used may not have been properly designed for general use. Accordingly, there is a need for a definition of function strength information that can universally reduce cache misses regardless of differences in individual programs.

Accordingly, there is a need for a cache coloring method based on such definition of function strength information that cache misses can be universally reduced regardless of differences in individual programs.

[Patent Document 1] Japanese Patent Application Publication No. 2005-266941

[Patent Document 2] Japanese Patent Application Publication No. 2003-271394

SUMMARY OF THE INVENTION

According to one implementation, a method of performing cache coloring includes the steps of generating a dynamic function flow representing a temporal sequence in which a plurality of functions are called at a time of executing a program comprised of the plurality of functions by executing the program by a computer, generating function strength information in response to the dynamic function flow by use of the computer, the function strength information including information about runtime relationships between any given one of the plurality of functions and all the other ones of the plurality of functions in terms of a way the plurality of functions are called and further including information about degree of certainty of cache miss occurrence, and allocating the plurality of functions to memory space by use of the computer in response to the function strength information such as to reduce instruction cache conflict.

According to another implementation, an apparatus for performing cache coloring includes a memory configured to store a cache coloring program and a program comprised of a plurality of functions, a processing unit configured to execute the cache coloring program stored in the memory to perform cache coloring with respect to the program comprised of the plurality of functions, the processing unit executing the cache coloring program to perform the steps of generating a dynamic function flow representing a temporal sequence in which the plurality of functions are called at a time of executing the program comprised of the plurality of functions, generating function strength information in response to the dynamic function flow, the function strength information including information about runtime relationships between any given one of the plurality of functions and all the other ones of the plurality of functions in terms of a way the plurality of functions are called and further including information about degree of certainty of cache miss occurrence, and allocating the plurality of functions to memory space in response to the function strength information such as to reduce instruction cache conflict.

According to yet another implementation, a record medium having a cache coloring program embodied therein is provided. The cache coloring program includes program codes for causing a computer to perform generating a dynamic function flow representing a temporal sequence in which a plurality of functions are called at a time of executing a target program comprised of the plurality of functions by causing the computer to execute the target program, generating function strength information in response to the dynamic function flow, the function strength information including information about runtime relationships between any given one of the plurality of functions and all the other ones of the plurality of functions in terms of a way the plurality of functions are called and further including information about degree of certainty of cache miss occurrence, and allocating the plurality of functions to memory space in response to the function strength information such as to reduce instruction cache conflict.

According to at least one embodiment of the present invention, function strength information is generated in response to a dynamic function flow representing a time sequence in which a plurality of functions are called at the time of program execution, such that the function strength information includes information about runtime relationships between all the functions in terms of a way the functions are called, and also includes the degree of certainty of cache miss occurrence. The dynamic function flow may be generated by tracing the calling of functions at the time of program execution. The function strength information can represent mutual relationships between functions (relationships between any given function and all the other functions), which was impossible in the conventional art, and can also reflect the degree of certainty of cache miss occurrence. The use of such information makes it possible to provide the optimum allocation of functions that universally reduces the number of cache misses.

BRIEF DESCRIPTION OF THE DRAWINGS

Other objects and further features of the present invention will be apparent from the following detailed description when read in conjunction with the accompanying drawings, in which:

FIG. 3 is a drawing for explaining function strength based on the dynamic function flow;

FIG. 4 is a drawing showing a matrix of basic function strength;

FIG. 7 is a drawing showing a matrix of function strength information according to a first embodiment;

FIG. 8 is a drawing showing a matrix of function strength information according to a second embodiment;

FIG. 9 is a drawing showing a matrix of function strength information according to a third embodiment;

FIG. 12 is a drawing showing function M(i) corresponding to the function strength information of FIG. 7;

FIG. 13 is an illustrative drawing showing a sequence of functions that are arranged according to the first embodiment of the function allocating method when the function strength information of FIG. 7 is used;

FIG. 15 is an illustrative drawing showing a sequence of functions that are arranged according to the second embodiment of the function allocating method when the function strength information of FIG. 7 is used;

DESCRIPTION OF THE PREFERRED EMBODIMENTS

In the following, embodiments of the present invention will be described with reference to the accompanying drawings.

Figure 1:
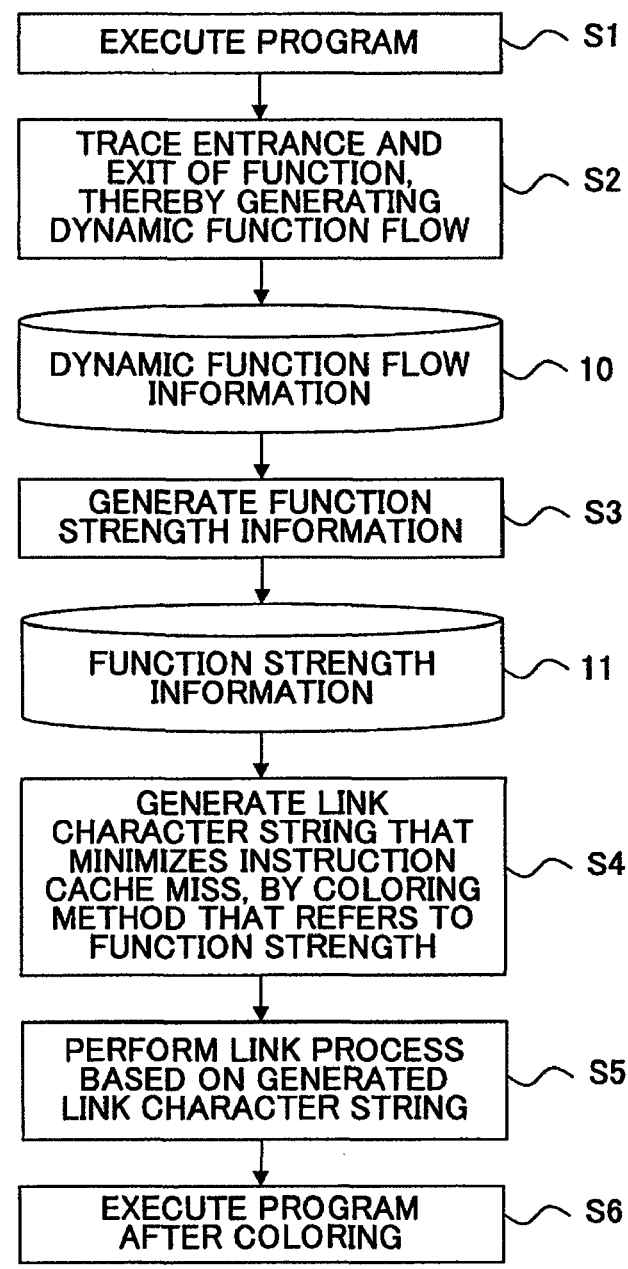
FIG. 1 is a flowchart showing an embodiment of a cache coloring method according to the invention.

FIG. 1 is a flowchart showing an embodiment of a cache coloring method according to the invention.

In step S1 of FIG. 1, a program to be subjected to cache coloring is executed by use of a simulator or the like. In step S2, the entrance and exit of functions are traced, thereby generating a dynamic function flow 10. The dynamic function flow 10 is a time series in which functions called at the time of program execution are arranged in the order of calls (in the order of executions). The dynamic function flow 10 directly reflects relationships between functions as to the way the functions are called at the time of execution. The generation of the dynamic function flow 10 will later be described in detail.

In step S3, function strength information 11 is generated based on the dynamic function flow 10. The function strength information 11 includes time-sequence information about all the functions in addition to information about the number of calls and the sequence of calls that are included in the related-art strength of function. The generation of the function strength information 11 will later be described in detail.

At step S4, a link character string that minimizes instruction cache miss is generated by coloring that refers to the function strength information 11. The generation of the link character string will later be described in detail. In step S5, a linker allocates functions to memory space and links the functions based on the generated link character string, thereby generating an executable module. In step S6, the generated executable module is executed to execute the program to which coloring has been performed.

In the present invention as described above, relationships between functions as to the way the functions are called are traced at the time of program execution, thereby generating the dynamic function flow 10 that is a time sequence indicative of the runtime relationship between functions as to the way the functions are called. Based on the dynamic function flow 10, the function strength information 11 is generated that includes information about the runtime relationships between all the functions as to the way the functions are called. The function strength information 11 represents mutual relationships between functions (relationships between any given function and all the other functions), which was impossible in the conventional art. Further, the function strength information 11 has universal applicability by taking into account the degree of certainty of cache miss occurrence. The use of such information makes it possible to provide the optimum allocation of functions that minimizes the number of instruction cache misses.

As the direct method can be regarded as a set-associative method in the case of a cache way being "1", a set-associative method including a direct method will be used as an example in the following description.

A description will first be given of the extraction of the dynamic function flow 10.

Figure 2:
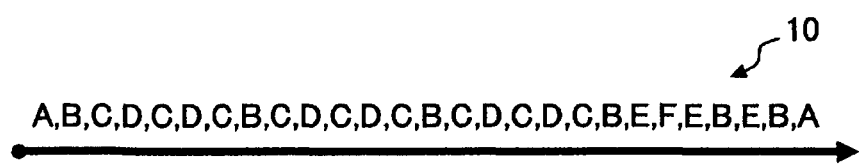
FIG. 2 is a drawing showing an example of a dynamic function flow.

A program of interest includes functions A, B, C, D, E, and F, and is executed by a simulator. The entrance and exit of the individual functions A, B, C, D, E, and F are traced, recording in sequence all functions that are called from the start to the end of the program execution, thereby generating a time series of functions. FIG. 2 is an illustrative drawing showing an example of the dynamic function flow 10 in a case where the program comprised of the functions A, B, C, D, E, and F is executed. The function A is executed first, followed by the execution of the function B called by the function A. Thereafter, functions are successively called and executed in the following sequence: C, D, C, D, C, B, and so on.

In the following, a description will be given of the generation of the function strength information 11 based on the dynamic function flow 10.

A basic function strength that serves as a bases for the function strength information 11 will be described first.

"Rij" denotes a set of sections, each of which extends from reference to a function i to first reference to a function j (including i and excluding j). Among all the sections that are Rii, the number of sections in which the function j is referred to at least once is obtained from the dynamic function flow, and is denoted as n(i, j). If i=j, n(i, j) is regarded as the total number of references to the function i. n(i, j) obtained in this manner is defined as a basic function strength.

n(i, j) is equal to the number of cache misses that occur when the function i and function j (O i) are allocated to the same cache line. Namely, n(i, j) defines the function strength by the magnitude of cache conflict. The larger the function strength n(i, j), the larger an effect on the cache. Provision is thus made to avoid allocating functions having a large function strength n(i, j) with respect to each other to the same cache line, and to allocate functions having a small n(i, j) with respect to each other to the same cache line. This reduces the possibility of cache conflict.

FIG. 3 is an illustrative drawing for explaining a function strength n(B, D) with respect to the dynamic function flow 10 of FIG. 2. As shown by underlines having different appearances in FIG. 3, there are five sections RBB of the function B (i.e., sections extending until the function B appears next time). Among the five sections RBB, three of them include at least one reference to D. n (B, D) is thus 3. By obtaining strength functions for all the combinations of functions in the same manner, a matrix as shown in FIG. 4 is obtained.

In the following, a description will be given of a method of generating the function strength information 11 by taking into account the degree of certainty of cache miss occurrence in addition to the basic function strength n(i, j).

The basic function strength n(i, j) described above indicates the number of sections in which the function j is referred to at least once during the period in which the function i is referred to twice. n(i, j) is equal to the number of cache misses that occur when the function i and function j (≠i) are allocated to the same cache line. Strictly speaking, however, the probability of cache miss occurrence is not 1 even if the function i and function j are allocated to the same cache line. Cache miss occurs only when a program instruction in the function i and a program instruction in the function j allocated to the same cache line as the function i are both executed. Accordingly, the definition of the function strength information 11 should preferably be a definition that reflects the degree of certainty of cache miss occurrence as described above.

Factors that affect the degree of certainty of cache miss occurrence includes the number of functions (i.e., the number of function types in respect of functions other than the function i) that are called in the sections belonging to Rii. A first embodiment of the function strength information 11 is obtained by using the number of function types in respect of functions other than the function i.

Figures 5, 6:
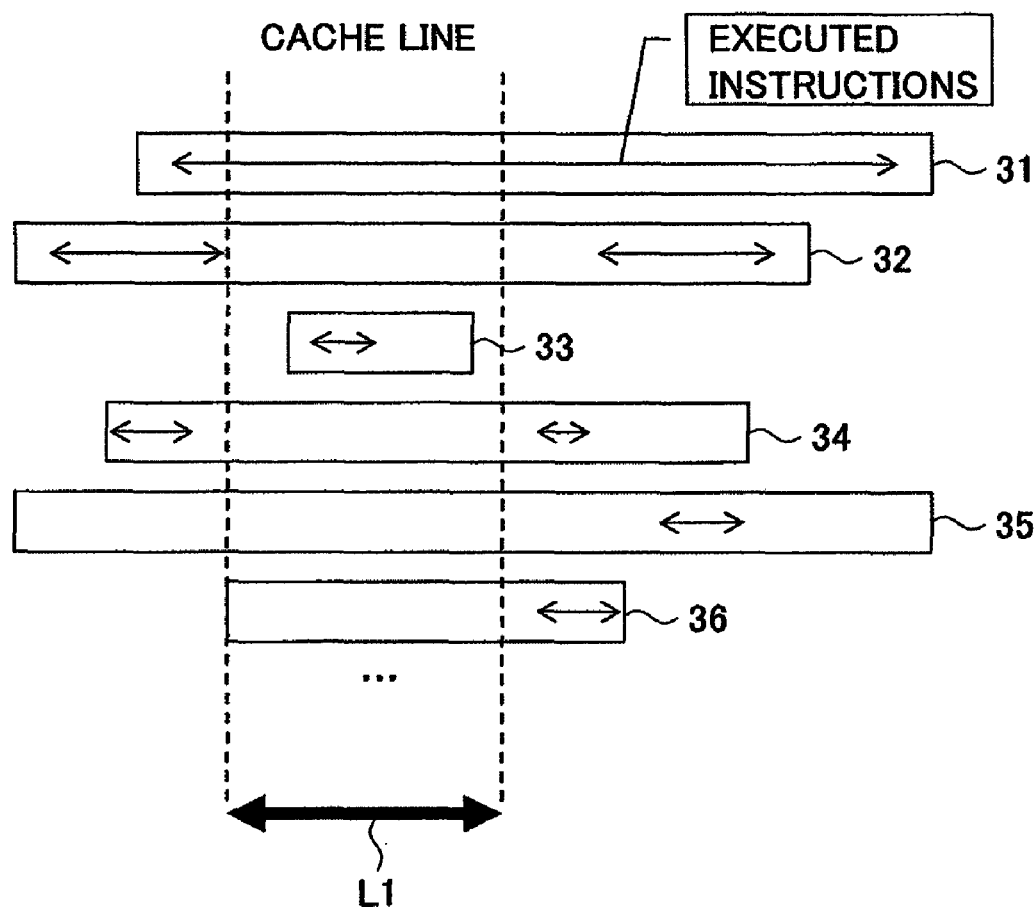
FIG. 5 is a drawing showing examples of a section in which the function j is referred to at least once.
FIG. 6 is a drawing for explaining the fact that the number of cache misses probabilistically increases as the number of functions allocated to a single cache line increases.

FIG. 5 is a drawing showing examples of a section in which the function j is referred to at least once. In case Ia shown in FIG. 5, the function j (≠i) is referred to once, for example, in a section belonging to Rii. In case Ib, in like manner, the function j (≠i) is referred to once, for example, in a section belonging to Rii. In each case, the symbol "■■■" represents another function that is neither the function i nor the function j. In the examples shown in FIG. 5, the number of function calls is greater in case Ib than in case Ia.

Assuming that functions are evenly allocated to the cache lines, it is probabilistically true that among the functions called during a section of interest, the number of functions allocated to the same cache line as the function i increases as the number of functions called in the section of interest increases. Further, the number of cache misses probabilistically increases as the number of functions allocated to the same cache line as the function i increases.

FIG. 6 is a drawing for explaining the fact that the number of cache misses probabilistically increases as the number of functions allocated to a single cache line increases. In the example shown in FIG. 6, six functions 31 through 36 are allocated to a memory space portion inclusive of a cache line L1. Program instruction portions indicated by arrows in the functions 31 through 36 correspond to portions executed in the section illustrated with respect to case Ib in FIG. 5, for example. In this example, program instruction portions allocated to the cache line L1 are executed with respect to the function 31 and function 33. Namely, cache conflict occurs in the cache line L1 between the function 31 and the function 33. When the function 33 is executed after the function 31, for example, cache miss occurs at the time of executing the function 33.

In this manner, the probability that an instruction allocated in the cache line L1 is executed at the time of function execution probabilistically increases as the number of functions allocated to the cache line L1 increases. Namely, the larger the number of functions allocated to the same cache line L1, the higher the probability of cache miss occurrence is. As is described above, further, among the functions called during a section of interest, the number of functions allocated to the same cache line L1 probabilistically increases as the number of functions called in the section of interest increases. Accordingly, the larger the number of functions called in a section of interest, the higher the probability of cache miss occurrence is. In the examples shown in FIG. 5, therefore, the probability of cache miss occurrence is higher for case Ib than for case Ia.

In consideration of the above, as a first embodiment of the function strength information 11, function strength information $n1(i, j)$ taking into account the degree of certainty of cache miss occurrence is defined as follows with respect to the function j ($\neq$i) in a section belonging to Rii:

$$n1(i,j)=\text{kind}(i,j)\cdot n(i,j).$$

Here, kind(i, j) is the number of types of functions (excluding the function i) appearing in any of the sections belonging to Rii in which the function j ($\neq$i) is referred to at least once. In the case of the dynamic function flow 10 shown in FIG. 2, for example, there are five sections RBB of the function B as shown in FIG. 3. Among the five sections RBB, three of them include at least one reference to D. n(B, D) is thus 3. Further, the types of functions that appear in any of these three sections other than the function B are a function C and a function D. Accordingly, the number of types of functions appearing in any of these three sections, i.e., kind (B, D), is 2. As a result, $n1(i, j)$ obtained is equal to 6 (=3×2). By obtaining each $n1(i, j)$ in the same manner, a matrix as shown in FIG. 7 is obtained. Values shown in this matrix are the function strength information $n1(i, j)$ according to the first embodiment.

As can be seen from the comparison of function strength information n(i, j) shown in FIG. 4 with function strength information $n1(i, j)$ shown in FIG. 7, n(A, F) and n(E, F) are both 1 in FIG. 4 whereas n1(E, F) and n1(A, F) are 1 and 5, respectively, in FIG. 7. This difference will be described briefly in the following.

Information strength information n(i, j) shown in FIG. 4 is now checked against the dynamic function flow 10 shown in FIG. 2. In FIG. 2, a section RAA is equal to the entirety of the dynamic function flow 10, and the function F appears in this section. Accordingly, n(A, F)=1. A section REE appears twice near the end of the dynamic function flow 10 shown in FIG. 2. In one of these two sections (i.e, "EFE"), the function F appears.

Accordingly, n(E, F)=1. As long as basic function strength n(i, j) is concerned, thus, the likelihood of cache miss occurrence upon arranging the function A and the function F on the same cache line does not differ from the likelihood of cache miss occurrence upon arranging the function E and the function F on the same cache line. In reality, however, the degree of certainty of cache miss occurrence with respect to the above-noted section RAA is believed to be higher than the degree of certainty of cache miss occurrence with respect to the section REE.

Function strength information $n1(i, j)$ shown in FIG. 7 incorporates a difference in the degree of certainty of cache miss occurrence between the section RAA and the section REE. Namely, the fact that n1(A, F) is equal to 5 reflects the high degree of certainty of cache miss occurrence with respect to the section RAA. In this case, the section RAA includes not only the function F but also the functions B through E, so that n1(A, B) through n1(A, E) are all equal to 5 in addition to n1(A, F). The degree of certainty of cache miss occurrence taken into account in this case does not only takes into account cache conflict between the function A and a single function appearing in the section RAA (e.g., function F). Rather, the degree of certainty of cache miss occurrence in this case takes into account cache conflict between the function A and all the functions appearing in the section RAA. As a result, not only n1(A, F) but also n1(A, B) through n1(A, E) assume large values.

In the following, a second embodiment of the function strength information 11 will be described. As a second embodiment of the function strength information 11, function strength information $n2(i, j)$ taking into account the degree of certainty of cache miss occurrence is defined as follows with respect to the function j ($\neq$i) in a section belonging to Rii:

$$n2(i,j)=K(i)\cdot n(i,j)$$

Here, K(i) is the number of types of functions (excluding the function i) appearing in any of the sections belonging to Rii. In the case of the dynamic function flow 10 shown in FIG. 2, for example, there are five sections RBB of the function B as shown in FIG. 3. The types of functions that appear in any of these five sections RBB other than the function B are functions C, D, E and F. Accordingly, K(B)=4. It follows that each element n(B, ■) appearing in a row corresponding to the function B in FIG. 4 will be multiplied by 4. As a result, element values 0, 6, 3, 3, 2, 1 in the row corresponding to the function B will be 0, 24, 12, 12, 8, 4, respectively. These values are used as function strength information n2(B, ■). By obtaining each $n2(i, j)$ in the same manner, a matrix as shown in FIG. 8 is obtained. Values shown in this matrix are the function strength information $n2(i, j)$ according to the second embodiment.

In the following, a third embodiment of the function strength information 11 will be described. As a third embodiment of the function strength information 11, function strength information $n3(i, j)$ taking into account the degree of certainty of cache miss occurrence is defined as follows with respect to the function j ($\neq$i) in a section belonging to Rii:

$$n3(i,j)=\Sigma(r\text{kind}(i,j)).$$

Here, rkind(i, j) is the number of types of functions (excluding the function i) appearing in a section of interest belonging to Rii in which the function j ($\neq$i) is referred to at least once. The symbol "Σ" adds up rkind(i, j) with respect to all the sections belonging to Rii in which the function j ($\neq$i) is referred to at least once. In the case of the dynamic function flow 10 shown in FIG. 2, for example, there are five sections RBB of the function B as shown in FIG. 3. Among the five sections RBB, three of them include at least one reference to D. The numbers of types of functions that appear in each of these three sections other than the function B are 2, 2, and 2, respectively. Accordingly, n3(B, D) is equal to 6 (=2+2+2) as a cumulative value over these three sections. By obtaining each $n3(i, j)$ in the same manner, a matrix as shown in FIG. 9 is obtained. Values shown in this matrix are the function strength information $n3(i, j)$ according to the third embodiment.

In the following, a fourth embodiment of the function strength information 11 will be described. As a fourth embodiment of the function strength information 11, function strength information $n4(i, j)$ taking into account the degree of certainty of cache miss occurrence is defined as follows with respect to the function j ($\neq$i) in a section belonging to Rii:

$$n4(i,j)=X(i,j)\cdot n(i,j).$$

Here, X(i, j) is an attribute value that is defined based on at least one of the function i and the function j. Function strength information $n4(i, j)$ is obtained through operation between attribute value X(i, j) and basic function strength n(i, j). In the formula shown above, this operation takes the form of multiplication. However, this operation is not limited to multiplication, and may be subtraction, addition, division, or any operation. If the operation is multiplication, and X(i, j) is equal to the number of types of functions (excluding the function i) appearing in any of the sections belonging to Rii in which the function j (≠i) is referred to at least once, then, the obtained function strength information is the same as that of the first embodiment. If X(i, j) is determined only based on the function i regardless of the function j, and is equal to the number of types of functions (excluding the function i) appearing in any of the sections belonging to Rii, then, the obtained function strength information is the same as that of the second embodiment. In this manner, function strength information n4(i, j) according to the fourth embodiment is defined as information that can incorporate various cases.

Attribute X(i, j) may be defined as a value reflecting either the degree of instruction cache activity of the function i or the function j or the degree of mutual coupling between the function i and the function j. The degree of instruction cache activity of the function i or the function j may be the degree of instruction cache activity based on the complexity of function as obtained by static syntax analysis, the degree of instruction cache activity based on the number of branches in a function as obtained by dynamic runtime analysis, the degree of instruction cache activity based on the lengths of branches in a function as obtained by dynamic runtime analysis, etc. The degree of mutual coupling between the function i and the function j may be the degree of coupling based on the number of shared external variables, the degree of coupling based on the hierarchical structure of the program, etc.

In the following, a description will be given of a case in which the attribute of the function i is defined, as a first example, based on the degree of complexity as obtained from syntax information about function descriptions. In this case, weighting factors are defined with respect to individual types of statements constituting the function program, and the number of occurrences of each statement is counted. The degree of complexity is defined as the sum of the numbers of occurrences of statements multiplied by the respective weighting factors as added up for all the statement types.

For example, the weighting factor of a branch statement is c1, the weighting factor of an iteration statement such as a "for" statement being c2, and the weighting factor of a memory transfer statement being c3. The number of occurrences is n1 for branch statements, n2 for iteration statements such as a "for" statement, and n3 for memory transfer statements. In this case, the attribute value X(i, j) defined by the function i is as follows.

$$X(i,j)=c1 \cdot n1+c2 \cdot n2+c3 \cdot n3.$$

Alternatively, the attribute value obtained in this manner may be divided by the size of the function i to obtain an attribute value Xunit(i, j) as defined for the unit size of the function, which is then used as the degree of complexity.

$$X\mathrm{unit}(i,j)=(c1 \cdot n1+c2 \cdot n2+c3 \cdot n3)/\text{Size of Function } i$$

Degree of complexity X(i, j) or Xunit(i, j) obtained in this manner indicates the degree of complexity of movement of an instruction address that frequently moves around due to a jump and the like in addition to sequential increments during the execution of the function i. The larger the degree of complexity, the higher the degree of certainty of cache miss occurrence is because of the increasingly frequent uses of an increasing number of entries of the instruction cache.

In the following, a description will be given of a case in which the attribute of the function i is defined, as a second example, based on the degree of complexity as obtained from the number of branches in a function. The program is first executed with respect to each function by use of a simulator or the like, thereby obtaining the number of branches with respect to each branch instruction. For example, the number of branches is c1 for branch instruction 1, c2 for branch instruction 2, and so on, with the number of branches being cn for branch instruction n. In this case, the attribute value X(i, j) defined by the function i is as follows.

$$X(i,j)=c1+c2+ \ldots +cn.$$

Alternatively, an attribute value Xunit(i, j) as defined for the unit size of the function, as previously described, may be obtained for use as the degree of complexity.

In the following, a description will be given of a case in which the attribute of the function i is defined, as a third example, based on the degree of complexity as obtained from the lengths of branches in a function. The program is first executed with respect to each function by use of a simulator or the like, thereby obtaining the number of executions with respect to each branch instruction in the function. Further, the length of branch (i.e., a difference between the instruction address of a branch origin and the instruction address of a branch destination) is obtained for each branch instruction. For example, the number of executions and the length of branch are c1 and l1, respectively, for branch instruction 1, c2 and l2, respectively, for branch instruction 2, and so on, with the number of executions and the length of branch being cn and ln, respectively, for branch instruction n. In this case, the attribute value X(i, j) defined by the function i is as follows.

$$X(i,j)=c1 \cdot l1+c2 \cdot l2+ \ldots +cn \cdot ln.$$

Alternatively, an attribute value Xunit(i, j) as defined for the unit size of the function, as previously described, may be obtained for use as the degree of complexity.

In the following, a description will be given of a case in which the mutual attribute of the function i and the function j is defined, as a fourth example, based on the degree of mutual coupling as obtained from the number of external variables shared by the function i and the function j. An increase in the degree of mutual coupling causes an increase in function strength, thereby increasing the degree of certainty affecting cache miss. The number of defined external variables shared by the function i and the function j is denoted as df, and a marker such as the number of executions is used as a weighting factor c. In this case, the attribute value X(i, j) defined by the function i and the function j is obtained as follows.

$$X(i,j)=df \cdot c$$

In the following, a description will be given of a case in which the mutual attribute of the function i and the function j is defined, as a fifth example, based on the degree of mutual coupling as obtained from the number of calls of the function i and the function j. An increase in the degree of mutual coupling causes an increase in function strength, thereby increasing the degree of certainty affecting cache miss. For example, the number of calls of the function i and the function j is c. In this case, the attribute value X(i, j) defined by the function i and the function j is obtained as follows.

$$X(i,j)=c$$

In the following, a description will be given of a case in which the mutual attribute of the function i and the function j is defined, as a sixth example, based on the degree of mutual coupling as obtained from the hierarchical relationships between the function i and the function j. In this example, a given function may call another function during the execution of a program. In such a case, the calling function is defined as a parent function, and the called function is defined as a child function, thereby providing a hierarchical structure for the relationships between these functions.

Figure 10C:
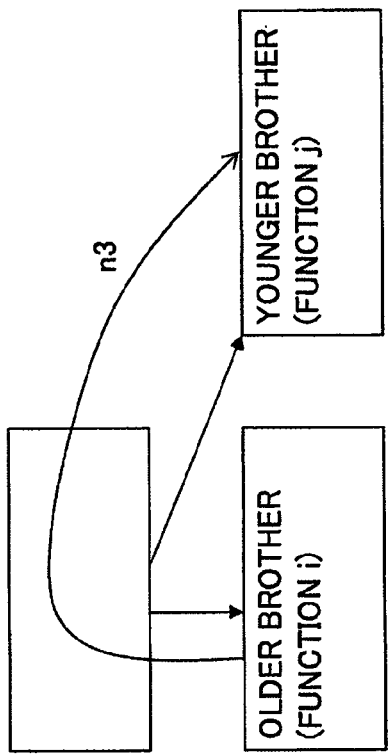
FIGS. 10A through 10C are drawings showing examples of the relationships between functions in the hierarchical structure of functions.
Figure 10B:
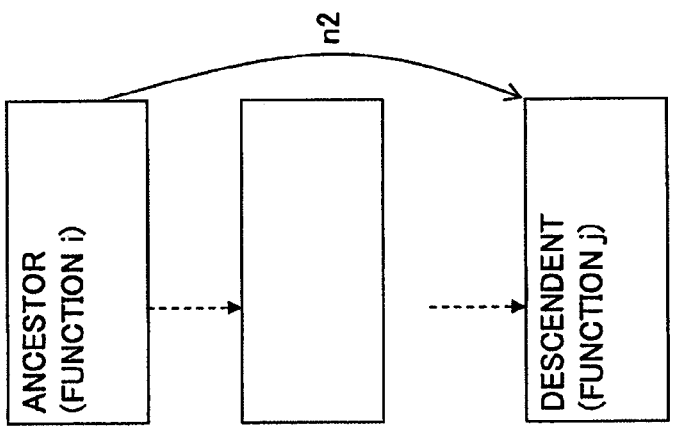
Figure 10A:
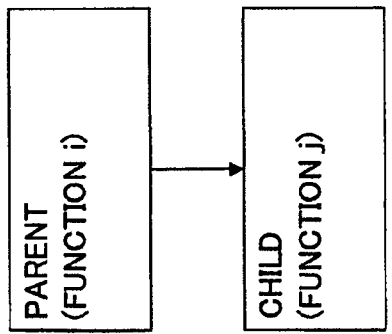

FIGS. 10A through 10C are drawings showing examples of the relationships between functions in the hierarchical structure of functions. In FIG. 10A, the function i and the function j have a parent-and-child relationship. In FIG. 10B, the function i and the function j have an ancestor-and-descendent relationship. In FIG. 10C, the function i and the function j have a sibling relationship. Coupling strength between functions is defined for each of these relationships. For example, coupling strength is 1 for a parent-and-child relationship, n2 (<1) for a direct ancestor-and-descendent relationship, and n3 (<1) for a sibling relationship. A marker such as the number of executions is used as a weighting factor c. For example, the number of executions is c1 for the parent-and-child relationship, c2 for the direct ancestor-and-descendent relationship, and c3 for the sibling relationship. In this case, the attribute value X(i, j) defined by the function i and the function j is obtained as follows.

$$X(i,j)=c1\cdot 1+c2\cdot n2+c3\cdot n3$$

In the following, a description will be given of a case in which the mutual attribute of the function i and the function j is defined, as a seventh example, based on the degree of mutual coupling as obtained from another function strength information. Japanese Patent Application Publication No. 2005-266941, filed by the assignee of this application, provides function strength information n+(i, j), n++(i, j), and n#(i, j). X(i, j) may be defined by use of the magnitude relationship between such function strength information and a properly determined threshold value c. For example, X(i, j) is defined by use of function strength information n+(i, j) and a proper value p.

$$n+(i,j)>c:X(i,j)=1$$

$$n+(i,j)\leq c:X(i,j)=p(0\leq p<1)$$

Alternatively, n++(i, j) or n#(i, j) may be used in place of function strength information n+(i, j). Further, a combination of various types of function strength information may be used.

It should be noted that function strength information n+(i, j) is defined as follows.

$$n+(i,j)=\Sigma(1\times Ref(k)/R(k))$$

R(k): Number of All Function References in Section k∈Rii≠j
Ref(k): Number of References to Function j in Section k∈Rii≠j
Further, function strength information n++(i, j) is defined as follows.

$$n++(i,j)=\Sigma(1\times Ref(k))$$

Ref(k): Number of References to Function j in Section k∈Rii≠j
Moreover, function strength information n#(i, j) is defined as follows.

$$n\#(i,j)=\Sigma(1/Len(k))$$

Len(k): Distance (≠0) to First Reference of Function j in Section k∈Rii≠j
Based on any function strength information n1(i, j) through n4(i, j) obtained above, functions are arranged in memory space in such a manner as to reduce the number of cache misses. In the following, such procedure will be described. All the examples described below will be directed to a case in which function strength information n1(i, j) is used. Any function strength information n2(i, j) through n4(i, j) may similarly be used.

Figure 11:
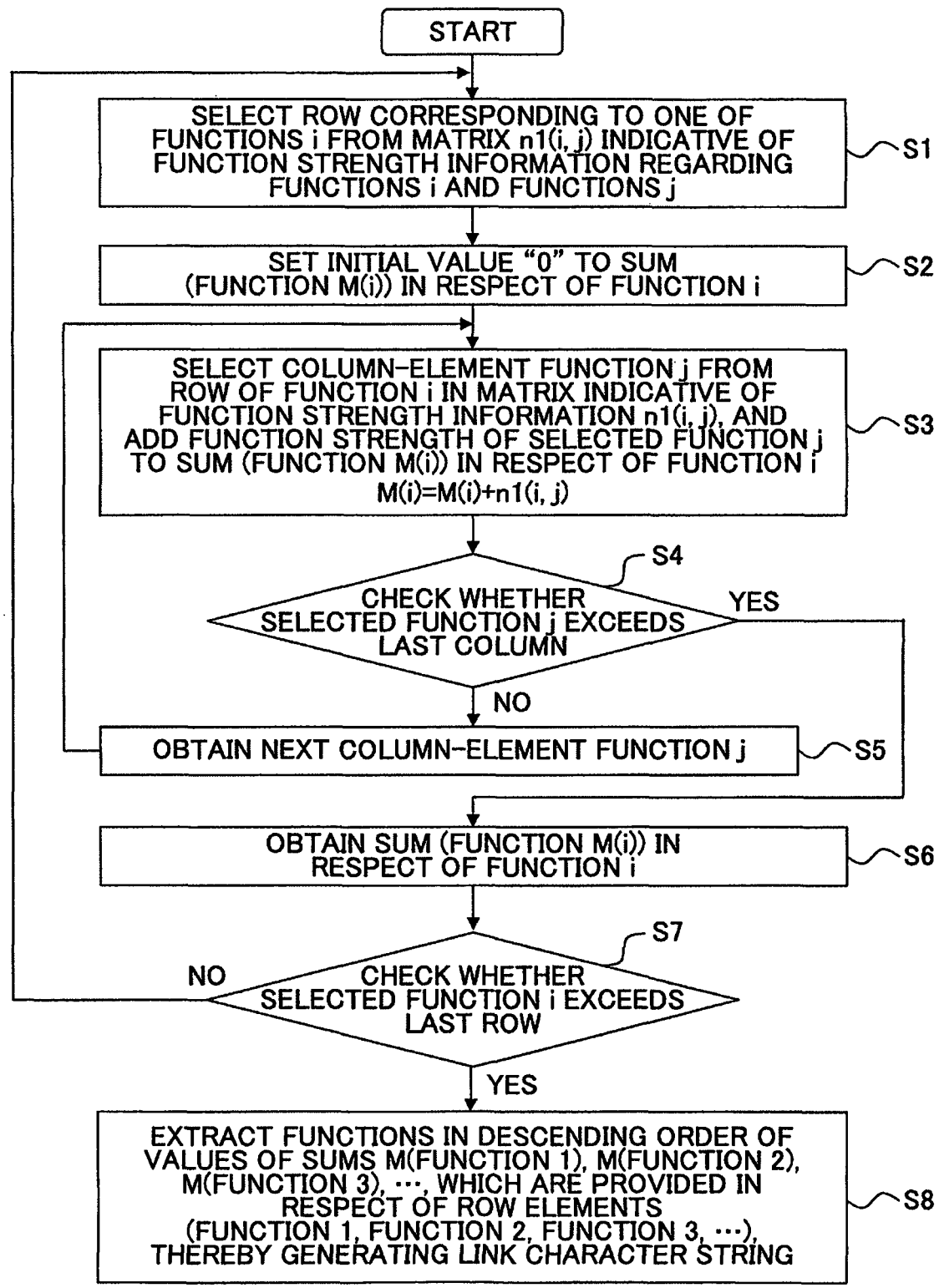
FIG. 11 is a flowchart showing a first embodiment of a function allocating method.

FIG. 11 is a flowchart showing a first embodiment of a function allocating method. In the first embodiment, functions are arranged successively in a descending order of the magnitude of function strength information.

In step S1, a row corresponding to one of the functions i is selected from a matrix n1(i, j) indicative of function strength information regarding the functions i and the functions j. The function i selected at the beginning is the function at the top row.

In step S2, a sum (function M(i)) in respect of the function i is initially set to "0".

In step S3, a column-element function j is selected from the row of the function i in the matrix indicative of function strength information n1(i, j). The function j selected at the beginning is that of the leftmost column where i≠j. The function strength of the selected function j is added to the sum (function M(i)) in respect of the function i.

In step S4, a check is made as to whether the selected function j exceeds the last column. If it does, the procedure goes to step S6. Otherwise, the procedure goes to step S5.

In step S5, a next column-element function j is obtained. The procedure then goes back to step S3 to repeat the subsequent steps.

In step S6, the sum (function M(i)) in respect of the function i is obtained.

In step S7, a check is made as to whether the selected function i exceeds the last row. If it does, the procedure goes to step S8.

Otherwise, the procedure goes back to step S1, followed by executing the same processes with respect to the function i of the next row.

After the steps described above are completed, the function M(i) (the sum of the function strength information 11 in respect of each function i) is obtained as shown in FIG. 12 with respect to the function strength information 11 of FIG. 7. The function M(i) corresponds to the sum of the numbers of cache misses that occur when other functions are allocated to the same cache line as the function i.

In step S8, functions are extracted in a descending order of the value of the sum M(i), which is provided in respect of the row elements (the functions i: i=1, 2, . . . ), thereby generating a link character string. Namely, the functions are arranged in the descending order of the value of M(i). FIG. 13 is an illustrative drawing showing a sequence of functions that are arranged according to the first embodiment of the function allocating method when the function strength information 11 of FIG. 7 is used.

The first embodiment of the function allocating method successfully prevents functions having strong function strength information 11 with respect to each other from being allocated on the same cache line (i.e., the same cache line occupying different logical addresses). Since the same cache line is allocated cyclically at intervals equivalent to the cache size in the memory space having consecutive addresses, the allocation of functions having large function strength information 11 ahead of the allocation of other functions makes it possible to finish allocating these functions having the large function strength information 11 before the same cache line appears next time. This insures that cache conflict does not occur.

In the flowing, a description will be given of a second embodiment of a method of allocating functions to memory space according to the function strength information 11.

Figure 14:
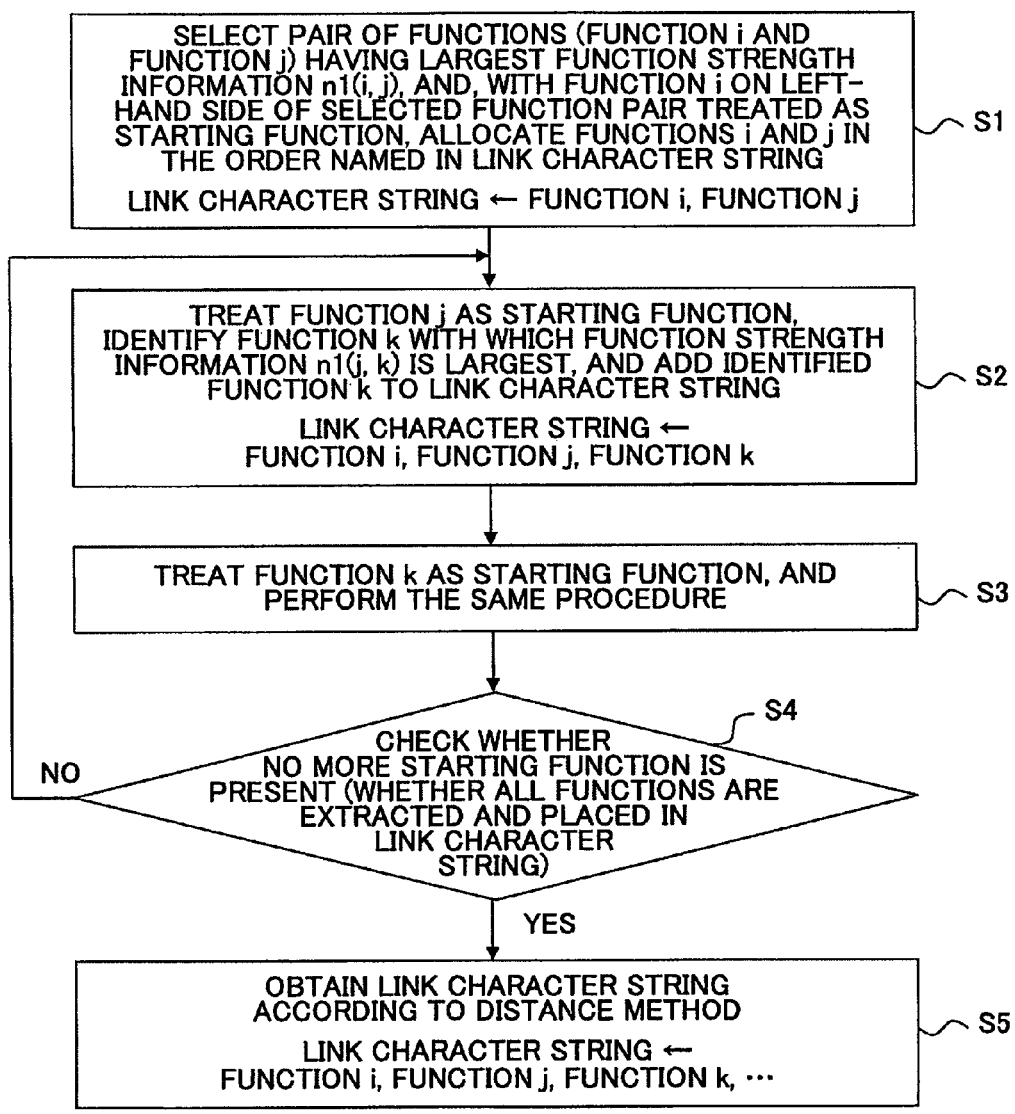
FIG. 14 is a flowchart showing a second embodiment of a function allocating method.

FIG. 14 is a flowchart showing a second embodiment of a function allocating method. In the second embodiment, the function strength information n1(i, j) of individual functions is taken into consideration in stead of the sum, and a pair of functions that would bring about cache misses most frequently are allocated next to each other, thereby eliminating cache conflict.

In step S1 of FIG. 14, a pair of functions (function i and function j) having the largest function strength information $n1(i, j)$ are selected. The function i on the left-hand side of the selected function pair is treated as a starting function, and the functions i and j are allocated in the order named in the link character string.

In step S2, the function j is treated as the starting function, and a function k with which the function strength information $n1(j, k)$ is the largest is identified. In so doing, the function k is selected from remaining functions excluding the functions already selected in the link character string. The identified function k is added to the end of the link character string.

In step S3, the function k is treated as the starting function, and the same procedure is performed.

In step S4, a check is made as to whether no more starting function is present (whether all the functions are extracted and placed in the link character string). If a starting function still exists, the procedure goes back to step S2 to repeat the subsequent steps.

In step S5, the link character string is obtained.

Figure 15:
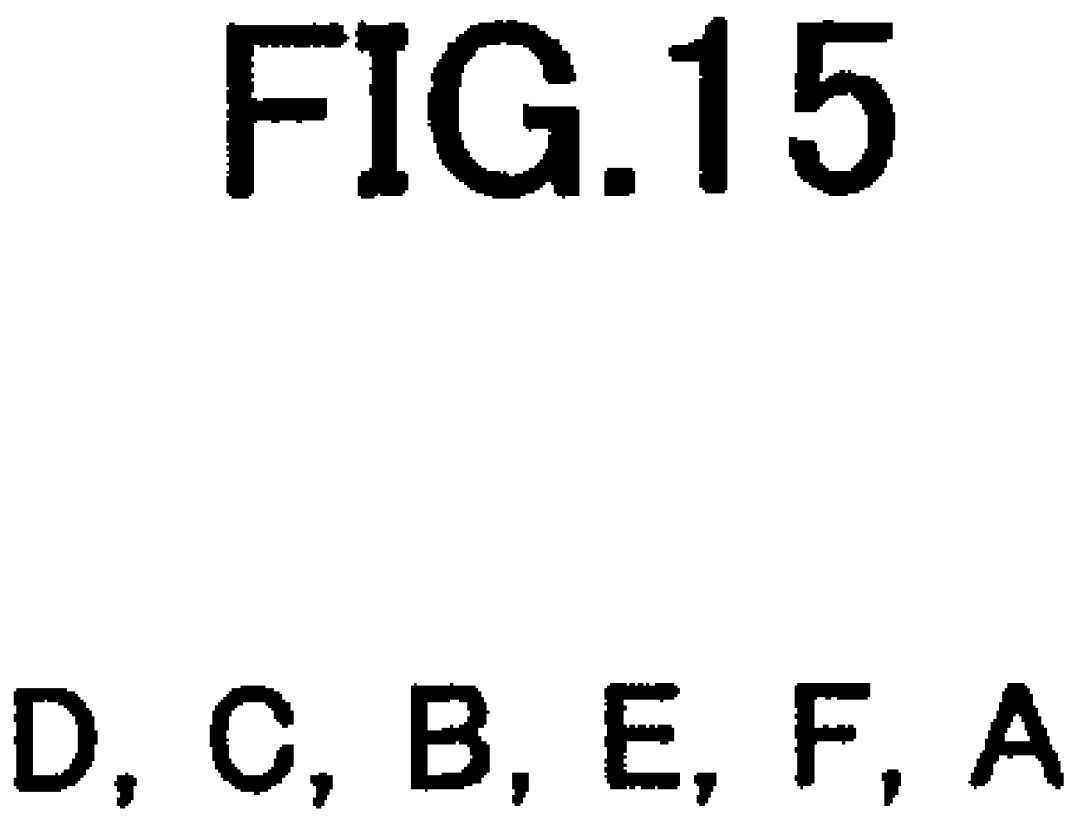

In the example of the function strength information 11 of FIG. 7, $n1(D, C)$ has the largest strength information. With the function D thus chosen as the starting function, the function C having the largest strength information is selected. With the function C then chosen as the starting function, the function B having the largest strength information is selected (the function D that has already been selected is not included in this selection process). By the same token, with the function B taken as the starting function, the function E having the largest strength information is then selected. With the function E chosen as the starting function, the function F having the largest strength information is selected. With the function F picked as the starting function, finally, the remaining function A is selected. FIG. 15 is an illustrative drawing showing a sequence of functions that are arranged according to the second embodiment of the function allocating method when the function strength information 11 of FIG. 7 is used.

When two or more functions have the same function strength information, a resulting arrangement of functions may greatly differ depending on which one of the functions is selected first. Where there are functions having the same function strength information, thus, certain criteria may be provided for selecting a function. For example, a user may determine an arrangement of functions. Alternatively, functions having smaller function size may be given priority, or functions that are called more often than others may be given priority.

In the second embodiment of the function allocating method as describe above, function size, in addition to the strength information, may be taken into account. Based on the idea that the smaller the function size, the closer situated the functions should be, the value "strength information/size" is defined, and functions are successively selected for allocation in a descending order of the defined values.

In the function allocating methods described heretofore, the functions are allocated in a selected sequence without taking into account cache lines in the memory space. On the other hand, the third embodiment of the function allocating method described in the following allocates functions on a cache-line-specific basis by use of the function strength information 11.

Figure 16:
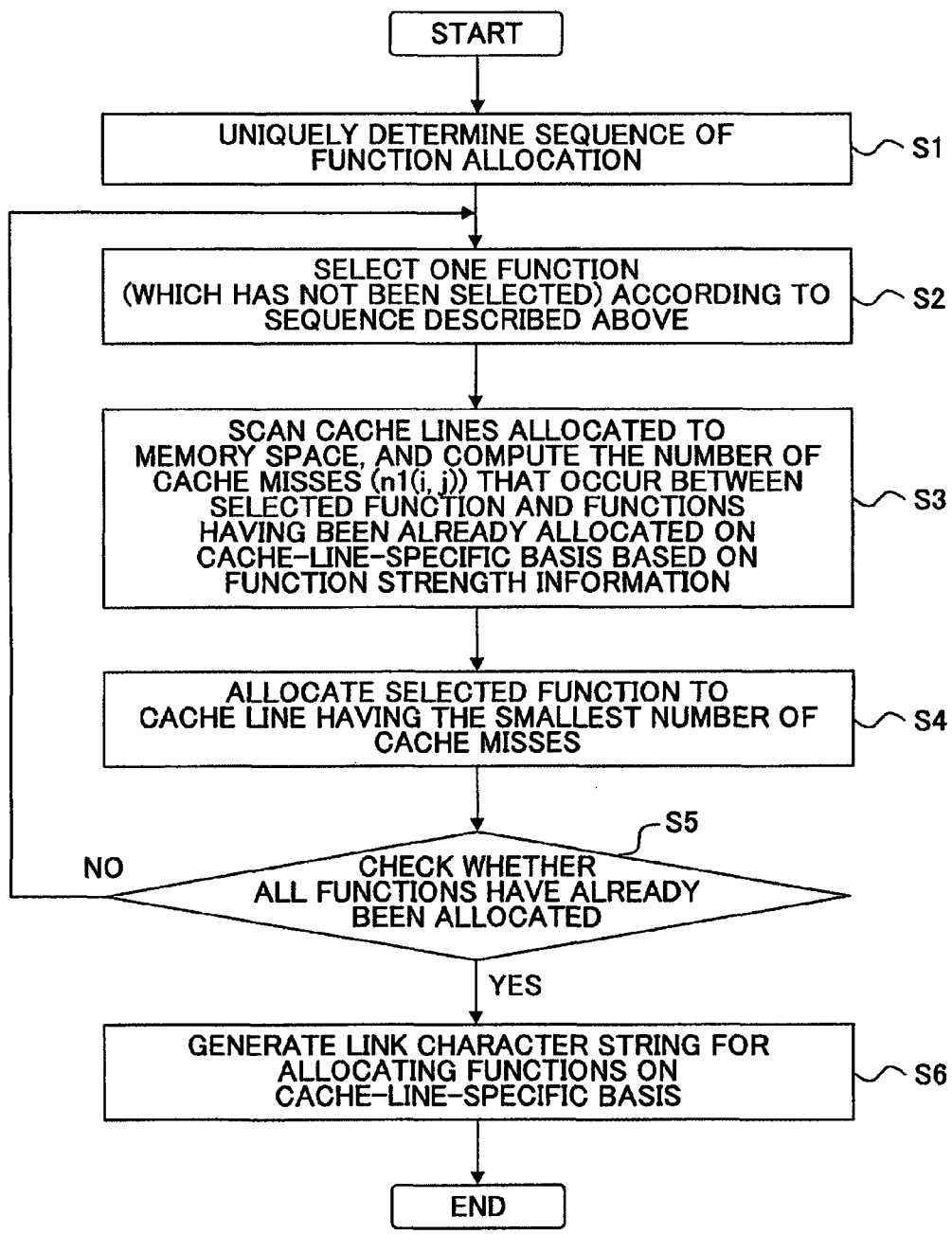
FIG. 16 is a flowchart showing a third embodiment of a function allocating method.

FIG. 16 is a flowchart showing a third embodiment of a function allocating method. In the third embodiment, functions are successively allocated to cache lines such that the cache lines for allocation are selected based on the function strength information 11 in a descending order of the number of cache misses.

In step S1 of FIG. 16, the sequence of function allocation is uniquely determined. For example, the sequence of allocation may be a descending order of M(i) that corresponds to the sum of the numbers of cache misses in the same manner as in the first embodiment of the function allocating method. The sequence is arbitrary as long as it can be uniquely determined. For example, the sequence may be a descending order of the number of self-calls $(n1(i, i))$. In step S2, a function (which has not been selected) is selected according to the sequence described above.

In step S3, the cache lines allocated to memory space are scanned, and the number of cache misses $(n1(i, j))$ that occur between the selected function and the functions having been already allocated is computed on a cache-line-specific basis based on the function strength information 11. In step S4, the function selected at step S2 is allocated to the cache line having the smallest number of cache misses computed at step S3. The processes performed in step S3 and step S4 will later be described in further detail.

In step S5, a check is made as to whether all the functions have already been allocated. If all the functions have already been allocated, the procedure goes to step S6. If an unallocated function still remains, the procedure goes back to step S2 for further execution of the subsequent steps.

In step S5, a link character string for allocating functions on a cache-line-specific basis is generated. With this, the procedure for allocating all the functions to memory space by taking into account cache lines comes to an end.

Figure 17:
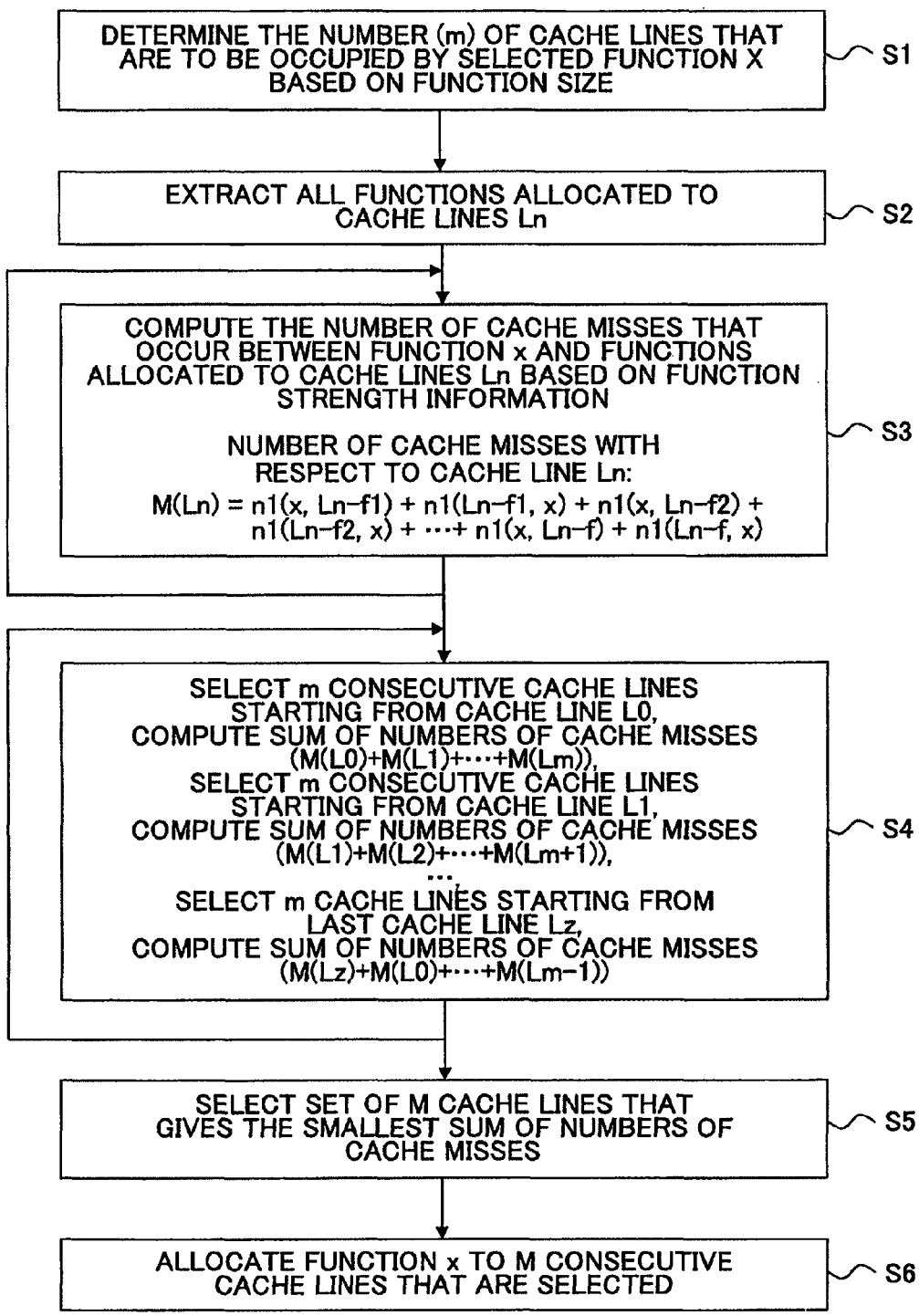
FIG. 17 is a flowchart showing a process of computing the number of cache misses on a cache-line-specific basis and allocating functions.

FIG. 17 is a flowchart showing a process of computing the number of cache misses on a cache-line-specific basis and allocating functions as performed in steps S3 and S4 of FIG. 16. In this example, z cache lines L1 through Lz are provided.

In step S1, the number m of cache lines that are to be occupied by a selected function x is determined based on the function size.

In step S2, all the functions allocated to the cache lines Ln (n=1 to z) are extracted. Since information about cache lines used for allocation are stored in an internal table at the time of function allocation, information about the already-allocated functions is available with respect to each cache line Ln. Based on this information, all the functions allocated to the cache lines Ln (n=1 to z) can be extracted. The functions allocated to the cache line Ln are denoted as Ln–f1, Ln–f2, Ln–f3, and Ln–f.

In step S3, the number of cache misses that occur between the function x and the functions allocated to the cache lines Ln (n=1 to z) is computed based on the function strength information. The number M(Ln) of cache misses with respect to the cache line Ln is computed as:

$$M(Ln) = n1(x, Ln-f1) + n1(Ln-f1, x) + n1(x, Ln-f2) +$$
$$n1(Ln-f2, x) + \ldots + n1(x, Ln-f) + n1(Ln-f, x).$$

In step S4, m consecutive cache lines are selected, starting from the cache line L0, and the sum of the numbers of cache misses $(M(L0)+M(L1)+\ldots+M(Lm))$ is computed, followed by selecting m consecutive cache lines starting from the cache line L1, with the sum of the numbers of cache misses $(M(L1)+M(L2)+\ldots+M(Lm+1))$ being computed. By the same token, the sum of the numbers of cache misses is computed for every m cache lines, until m cache lines starting from the last cache line Lz are selected, with the sum of the numbers of cache misses (M(Lz)+M(L0)+ . . . +M(Lm−1)) being computed. It should be noted that the first cache line L0 is considered to be a next cache line following the last cache line Lz.

In step S5, a set of m cache lines that gives the smallest sum of the numbers of cache misses according to step S4 is selected. In step S6, the function x is allocated to the m consecutive cache lines that are selected.

By use of the method of allocating functions on a cache-line-specific basis as described above, allocation to cache lines is determined with respect to all the functions B, C, D, A, E, and F. In such allocation to cache lines, functions are simply allocated on a cache-line-specific basis, so that logical addresses need to be specified at the time of a link process.

In the following, a description will be given of a method of obtaining logical addresses based on the information about function allocation to cache lines.

Figure 18:
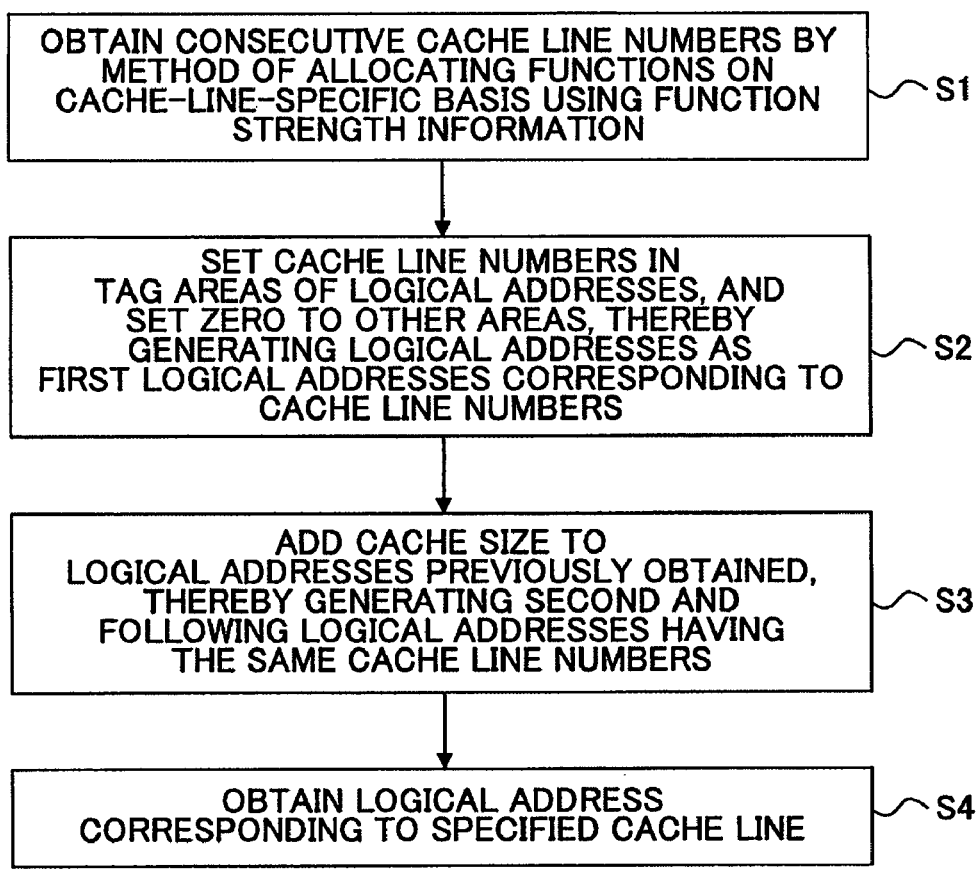
FIG. 18 is a flowchart showing a method of obtaining logical addresses of individual functions based on the allocation of functions to cache lines.

FIG. 18 is a flowchart showing a method of obtaining logical addresses of individual functions based on the allocation of functions to cache lines.

In step S1, consecutive cache line numbers are obtained by the method of allocating functions on a cache-line-specific basis using function strength information. Namely, cache lines to which a function is allocated are obtained with respect to each function.

In step S2, the cache line numbers are set in the tag areas of logical addresses, and other areas are set to zero, thereby generating logical addresses as the first logical addresses corresponding to the cache line numbers.

Figures 19A, 19B:
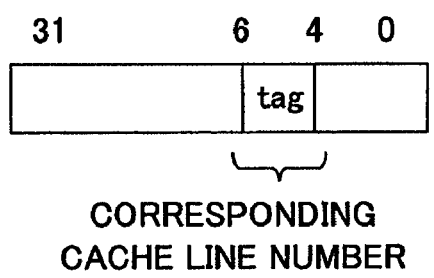
FIGS. 19A and 19B are illustrative drawings showing the structure of a logical address and a conversion table for converting cache line numbers into logical addresses.

FIGS. 19A and 19B are illustrative drawings showing the structure of a logical address and a conversion table for converting cache line numbers into logical addresses. As shown in FIG. 19A, 8 cache lines are specified by the fourth through sixth bits (tag area) of the logical address. As shown in FIG. 19B, the cache line L0, for example, is allocated to a logical address having the fourth through sixth bits indicating "0". The cache line L1, for example, is allocated to a logical address having the fourth through sixth bits indicating "1". In step S2 of FIG. 18, a cache line number is set to the fourth through sixth bits that form the tag area, and zero is set to the other bits. In this manner, logical addresses (first logical addresses) that provide a base for the cache lines L0 through L7 are obtained.

In step S3 of FIG. 18, the cache size is added to the logical addresses previously obtained, thereby generating the second and following logical addresses having the same cache line numbers. For example, the second logical addresses corresponding to the same cache line numbers are spaced apart by the cache size from the above-described logical addresses forming the base. Accordingly, adding the case size to the logical addresses forming the base will produce the second logical addresses. By the same token, the cache size is added to the preceding logical addresses to obtain corresponding addresses for the third and following logical addresses.

In step S4, a logical address corresponding to a specified cache line is obtained. Namely, a cache line is specified as a destination to which the function of interest is allocated, and the logical address corresponding to this specified cache line is obtained.

With the provision described above, logical addresses to which respective functions are to be allocated are determined.

Figure 20:
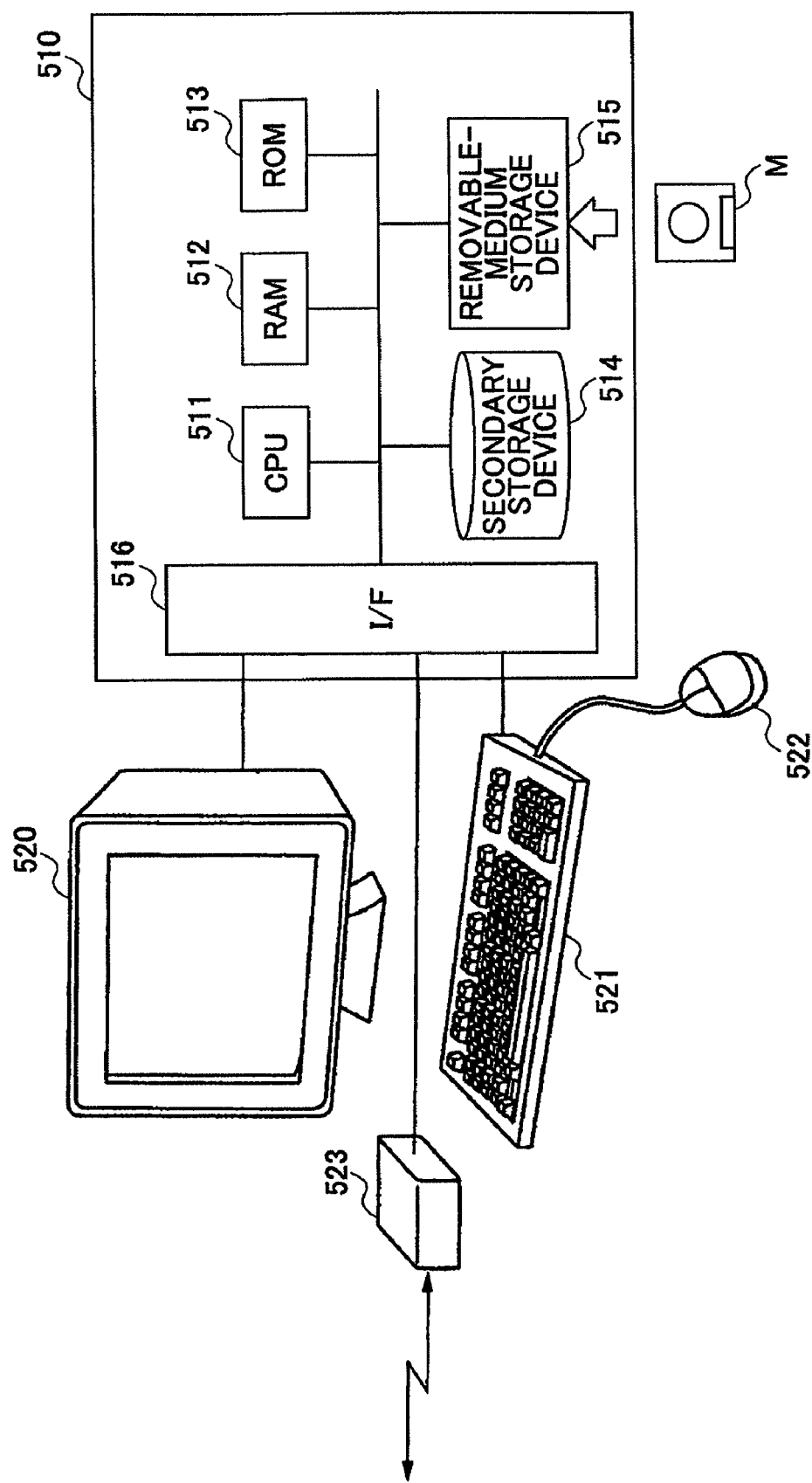
FIG. 20 is an illustrative drawing showing the construction of an apparatus for performing cache coloring according to the invention.

FIG. 20 is an illustrative drawing showing the construction of an apparatus for performing cache coloring according to the invention.

As shown in FIG. 20, the apparatus for performing the cache coloring method of the invention is implemented as a computer such as a personal computer, an engineering workstation, or the like. The apparatus of FIG. 20 includes a computer 510, a display apparatus 520 connected to the computer 510, a communication apparatus 523, and an input apparatus. The input apparatus includes a keyboard 521 and a mouse 522. The computer 510 includes a CPU 511, a ROM 513, a secondary storage device 514 such as a hard disk, a removable-medium storage device 515, and an interface 516.

The keyboard 521 and mouse 522 provide user interface, and receive various commands for operating the computer 510 and user responses responding to data requests or the like. The display apparatus 520 displays the results of processing by the computer 510, and further displays various data that makes it possible for the user to communicate with the computer 510. The communication apparatus 523 provides for communication to be conduced with a remote site, and may include a modem, a network interface, or the like.

The cache coloring method of the invention is provided as a computer program executable by the computer 510. This computer program is stored in a memory medium M that is mountable to the removable-medium storage device 515. The computer program is loaded to the RAM 512 or to the secondary storage device 514 from the memory medium M through the removable-medium storage device 515. Alternatively, the computer program may be stored in a remote memory medium (not shown), and is loaded to the RAM 512 or to the secondary storage device 514 from the remote memory medium through the communication apparatus 523 and the interface 516.

Upon user instruction for program execution entered through the keyboard 521 and/or the mouse 522, the CPU 511 loads the program to the RAM 512 from the memory medium M, the remote memory medium, or the secondary storage device 514. The CPU 511 executes the program loaded to the RAM 512 by use of an available memory space of the RAM 512 as a work area, and continues processing while communicating with the user as such a need arises. The ROM 513 stores therein control programs for the purpose of controlling basic operations of the computer 510.

By executing the computer program, the cache coloring method as described in the embodiments described heretofore are performed. This environment for performing the cache coloring method is the cache coloring apparatus.

Further, the present invention is not limited to these embodiments, but various variations and modifications may be made without departing from the scope of the present invention.

What is claimed is:

1. A method of performing cache coloring, comprising:

generating a dynamic function flow representing a temporal sequence in which a plurality of functions are called at a time of executing a program comprised of the plurality of functions by executing the program by a computer;

generating function strength information in response to the dynamic function flow by use of the computer, the function strength information including information about runtime relationships between any given one of the plurality of functions and all the other ones of the plurality of functions in terms of a way the plurality of functions are called; and allocating the plurality of functions to memory space by use of the computer in response to the function strength information such as to reduce instruction cache conflict, wherein the function strength information is represented as matrix information $n1(i, j)=kind(i, j) \cdot n(i, j)$, the $n(i, j)$ indicating a number of sections in which a function $j(\neq i)$ is referred to at least once, the sections being each defined as a section extending from given reference to function i to next reference to the function i in the dynamic function flow, the $n(i,j)$ indicating a total number of references to the function i if i=j, and the kind$(i,j)$ indicating a number of types of functions (excluding the function i) appearing in any of the sections in which the function $j(\neq i)$ is referred to at least once.

2. A method of performing cache coloring, comprising:
generating a dynamic function flow representing a temporal sequence in which a plurality of functions are called at a time of executing a program comprised of the plurality of functions by executing the program by a computer;
generating function strength information in response to the dynamic function flow by use of the computer, the function strength information including information about runtime relationships between any given one of the plurality of functions and all the other ones of the plurality of functions in terms of a way the plurality of functions are called; and
allocating the plurality of functions to memory space by use of the computer in response to the function strength information such as to reduce instruction cache conflict,
wherein the function strength information is represented as matrix information $n2(i,j)=K(i) \cdot n(i,j)$, the $n(i,j)$ indicating a number of sections in which a function $j(\neq i)$ is referred to at least once, the sections being each defined as a section extending from given reference to function i to next reference to the function i in the dynamic function flow, the $n(i,j)$ indicating a total number of references to the function i if i=j, and the $K(i)$ indicating a number of types of functions (excluding the function i) appearing in any of the sections being each defined as a section extending from given reference to function i to next reference to the function i in the dynamic function flow.

3. A method of performing cache coloring, comprising:
generating a dynamic function flow representing a temporal sequence in which a plurality of functions are called at a time of executing a program comprised of the plurality of functions by executing the program by a computer;
generating function strength information in response to the dynamic function flow by use of the computer, the function strength information including information about runtime relationships between any given one of the plurality of functions and all the other ones of the plurality of functions in terms of a way the plurality of functions are called; and
allocating the plurality of functions to memory space by use of the computer in response to the function strength information such as to reduce instruction cache conflict,
wherein the function strength information is represented as matrix information $n3(i,j)=\Sigma(rkind(i,j))$, the $rkind(i,j)$ indicating a number of functions appearing in a given one of a plurality of sections in which a function $j(\neq i)$ is referred to at least once, the sections being each defined as a section extending from given reference to function i to next reference to the function i in the dynamic function flow, the symbol "$\Sigma$" accumulating the $rkind(i,j)$ for all the sections in which the function $j(\neq i)$ is referred to at least once.

4. A method of performing cache coloring, comprising:
generating a dynamic function flow representing a temporal sequence in which a plurality of functions are called at a time of executing a program comprised of the plurality of functions by executing the program by a computer;
generating function strength information in response to the dynamic function flow by use of the computer, the function strength information including information about runtime relationships between any given one of the plurality of functions and all the other ones of the plurality of functions in terms of a way the plurality of functions are called; and
allocating the plurality of functions to memory space by use of the computer in response to the function strength information such as to reduce instruction cache conflict,
wherein the function strength information is represented as matrix information obtained through operation between $X(i,j)$ and $n(i,j)$, the $n(i,j)$ indicating a number of sections in which a function $j(\neq i)$ is referred to at least once, the sections being each defined as a section extending from given reference to function i to next reference to the function i in the dynamic function flow, the $n(i,j)$ indicating a total number of references to the function i if i=j, and the $X(i,j)$ indicating an attribute value determined based on at least one of the function i and the function j.

5. The method as claimed in claim 4, wherein the $X(i,j)$ is defined as a value reflecting either degree of instruction cache activity of the function i or the function j or degree of mutual coupling between the function i and the function j.

6. The method as claimed in claim 5, wherein the $X(i,j)$ is a value reflecting one of the degree of instruction cache activity responsive to complexity of function as obtained by static syntax analysis, the degree of instruction cache activity responsive to a number of branches in a function as obtained by dynamic runtime analysis, and the degree of instruction cache activity responsive to lengths of branches in a function as obtained by dynamic runtime analysis.

7. The method as claimed in claim 5, wherein the $X(i,j)$ is a value reflecting one of degree of coupling responsive to a number of shared external variables, degree of coupling responsive to a number of program calls, and degree of coupling responsive to a hierarchical structure of a program.

8. An apparatus for performing cache coloring, comprising:
a memory configured to store a cache coloring program and a program comprised of a plurality of functions;
a processing unit configured to execute the cache coloring program stored in the memory to perform cache coloring with respect to the program comprised of the plurality of functions, the processing unit executing the cache coloring program to perform:
generating a dynamic function flow representing a temporal sequence in which the plurality of functions are called at a time of executing the program comprised of the plurality of functions;
generating function strength information in response to the dynamic function flow, the function strength information including information about runtime relationships between any given one of the plurality of functions and all the other ones of the plurality of functions in terms of a way the plurality of functions are called; and
allocating the plurality of functions to memory space in response to the function strength information such as to reduce instruction cache conflict,
wherein the function strength information is represented as matrix information obtained through operation between $X(i,j)$ and $n(i,j)$, the $n(i,j)$ indicating a number of sections in which a function $j(\neq i)$ is referred to at least once, the sections being each defined as a section extending from given reference to function i to next reference to the function i in the dynamic function flow, the n(i, j) indicating a total number of references to the function i if i=j, and the X(i, j) indicating an attribute value determined based on at least one of the function i and the function j.

9. A record medium having a cache coloring program embodied therein, the cache coloring program comprising program codes for causing a computer to perform:
   generating a dynamic function flow representing a temporal sequence in which a plurality of functions are called at a time of executing a target program comprised of the plurality of functions by causing the computer to execute the target program;
   generating function strength information in response to the dynamic function flow, the function strength information including information about runtime relationships between any given one of the plurality of functions and all the other ones of the plurality of functions in terms of a way the plurality of functions are called; and
   allocating the plurality of functions to memory space in response to the function strength information such as to reduce instruction cache conflict,
   wherein the function strength information is represented as matrix information obtained through operation between X(i, j) and n(i, j), the n(i, j) indicating a number of sections in which a function j($\neq$i) is referred to at least once, the sections being each defined as a section extending from given reference to function i to next reference to the function i in the dynamic function flow, the n(i, j) indicating a total number of references to the function i if i=j, and the X(i, j) indicating an attribute value determined based on at least one of the function i and the function j.

* * * * *

UNITED STATES PATENT AND TRADEMARK OFFICE
CERTIFICATE OF CORRECTION

PATENT NO. : 8,341,354 B2
APPLICATION NO. : 12/078650
DATED : December 25, 2012
INVENTOR(S) : Shigeru Kimura It is certified that error appears in the above-identified patent and that said Letters Patent is hereby corrected as shown below:

In the Claims:

Column 17, Line 27, In Claim 2, delete "$j(\approx i)$" and insert -- $j(\neq i)$ --, therefor.

Signed and Sealed this
Seventh Day of May, 2013

Teresa Stanek Rea
*Acting Director of the United States Patent and Trademark Office*